(12) United States Patent
Amiguet et al.

(10) Patent No.: US 6,173,213 B1
(45) Date of Patent: Jan. 9, 2001

(54) MOTORIZED INBOUND LASER ORIENTATION AND WHEEL RECOGNITION STATION

(75) Inventors: Eugene W. Amiguet, Cypress; Dennis C. Kuhns, Anaheim; Jonathan A. Perez, Rancho Santa Margarita, all of CA (US)

(73) Assignee: Ellison Machinery Company, Santa Fe Springs, CA (US)

( * ) Notice: Under 35 U.S.C. 154(b), the term of this patent shall be extended for 0 days.

(21) Appl. No.: 09/075,959

(22) Filed: May 11, 1998

(51) Int. Cl.[7] .................................................... G06F 7/00
(52) U.S. Cl. ........................ 700/230; 700/226; 700/229
(58) Field of Search ..................................... 700/226, 230

(56) References Cited

U.S. PATENT DOCUMENTS

| 3,922,539 | 11/1975 | Carnes et al. . |
| 4,360,274 | 11/1982 | Norton-Wayne . |
| 4,441,205 | 4/1984 | Berkin et al. . |
| 4,486,776 | * 12/1984 | Yoshida ............................ 358/106 X |
| 4,644,584 | 2/1987 | Nagashima et al. . |
| 4,739,175 | 4/1988 | Tamura . |
| 4,759,075 | 7/1988 | Lipkie et al. . |
| 4,805,224 | 2/1989 | Koezuka et al. . |
| 4,810,895 | 3/1989 | Kafri et al. . |
| 5,018,213 | 5/1991 | Sikes . |
| 5,253,306 | 10/1993 | Nishio . |
| 5,301,786 | 4/1994 | Yoshihara . |
| 5,321,772 | 6/1994 | Sawyer . |
| 5,367,458 | 11/1994 | Roberts et al. . |
| 5,367,578 | 11/1994 | Golem et al. . |
| 5,406,642 | 4/1995 | Maruya . |
| 5,454,045 | 9/1995 | Perkins et al. . |
| 5,479,537 | 12/1995 | Hamashima et al. . |
| 5,644,139 | 7/1997 | Allen et al. . |
| 5,677,522 | 10/1997 | Rice et al. . |

OTHER PUBLICATIONS

Bert Moore, "Overcoming the image problem", Automatic I.D. News, p. 34, Mar. 1997.*

* cited by examiner

Primary Examiner—Christopher P. Ellis
Assistant Examiner—Gene O. Crawford
(74) Attorney, Agent, or Firm—Fulwider Patton Lee & Utecht, LLP (57) ABSTRACT

The wheel style recognition system for identifying and orienting wheel workpieces includes a wheel style recognition station, a conveyor for delivering a wheel workpiece to the wheel style recognition station, and a wheel orientation sensor that senses the radial orientation of the wheel workpiece on the wheel style recognition station, and generates a radial orientation signal. A wheel mapping sensor scans the wheel workpiece and generates a wheel style mapping signal pattern, while the wheel workpiece is rotated at a steady rate of rotation. A control unit compares the wheel style mapping signal pattern with at least one reference wheel style mapping signal pattern.

70 Claims, 2 Drawing Sheets

MOTORIZED INBOUND LASER ORIENTATION AND WHEEL RECOGNITION STATION

BACKGROUND OF THE INVENTION

1. Field of the Invention

This invention relates generally to a system and method for automated orientation and measurement of a workpiece, and more particularly concerns a system and method for automated identification, measurement, and radial orientation of rotary members such as motor vehicle wheels for automated processing or manufacturing operations.

2. Description of Related Art

Motor vehicle wheels typically have a central hub for mounting to an axle of the motor vehicle, a rim portion for mounting of a tire, and a spoke section connecting the rim portion to the hub. Lug holes are typically displaced radially outwardly from a central bore of the hub for receiving threaded lugs for mounting of the wheel to the axle of the vehicle, sockets are formed on the hub for nuts to be placed on the threaded lugs, and each wheel typically has a hole through the rim portion for a valve stem of a tire to be mounted on the rim of the wheel.

Production of motor vehicle wheels and processing of after-market customized wheels for motor vehicles is ideally automated for maximum mass production efficiency. Apparatus exists for drilling lug holes and valve stem holes for motor vehicles, including mechanisms for gripping and stabilizing motor vehicle wheel workpieces for accurate and consistent drilling, but drill hole locations can vary widely for various wheel styles and dimensions. However, the multiplicity of diverse styles, configurations and dimensions of such motor vehicle wheels that are available typically requires that an automated assembly line be set up to handle and batch process one specific type of wheel at a time, in turn requiring adjustments and possible retooling of assembly lines to accommodate processing or manufacture of a variety of wheels, resulting in considerable down time for such manufacturing and processing adjustments to be made. Manual identification, measurement and orientation of motor vehicle wheel workpieces for processing or manufacturing operations can be time consuming, subjective, and therefore subject to human error. It is therefore desirable to provide a system and method for automated orientation, measurement and identification of motor vehicle wheel workpieces for further processing and manufacturing operations to be performed on the motor vehicle wheel workpieces. The present invention meets these and other needs.

SUMMARY OF THE INVENTION

Briefly, and in general terms, the present invention provides for an improved system and method for automated orientation, measurement and identification of motor vehicle wheel workpieces for processing and manufacturing operations to be performed on the motor vehicle wheel workpieces.

The invention accordingly provides for a wheel style recognition system for identifying and orienting wheel workpieces. The system includes a wheel style recognition station, means for delivering a wheel workpiece to the wheel style recognition station, and means for sensing the radial orientation of the wheel workpiece on the wheel style recognition station, and for generating a radial orientation signal. Means are provided for scanning the wheel workpiece and for generating a wheel style mapping signal pattern, and in one presently preferred embodiment, means are also provided for rotating the wheel workpiece in a scanning position at the wheel style recognition station at a steady rate of rotation. Means are also provided for comparing the wheel style mapping signal pattern with at least one reference wheel style mapping signal pattern.

In one currently preferred embodiment, the wheel style recognition station includes a wheel style recognition platform, and a conveyor delivers the wheel workpiece to the wheel style recognition platform. The conveyor can also include a gate for controlling the delivery of the wheel workpieces to the wheel style recognition station by the conveyor. The wheel recognition station can also include a gripper assembly for gripping each wheel workpiece sequentially and positioning each wheel workpiece over the wheel recognition platform. In one presently preferred embodiment, means are provided for moving the wheel style recognition platform between a first position for receiving the wheel workpiece and a second position for scanning of the wheel workpiece, and can comprise a hydraulic or pneumatic lift for raising the platform from a lowered first position for receiving the wheel workpiece to a raised second position for scanning of the wheel workpiece, and for lowering the wheel style recognition platform to the lowered first position for receiving another wheel workpiece.

The means for sensing the radial orientation of the wheel workpiece comprises a sensor unit for detecting a marker on the wheel workpiece, such as a raised tab or indentation on the rim of the wheel workpiece. In one presently preferred embodiment, the wheel orientation sensor unit comprises a displacement sensing laser sensor that directs a focused laser beam that is reflected from the marker to a detector in the sensor unit. When the marker is oriented directly opposite the wheel orientation sensor, the wheel orientation sensor generates a wheel orientation signal indicating the wheel workpiece has reached a starting position for scanning of the wheel workpiece. In one presently preferred embodiment, the control unit compares a parameter of the wheel orientation signal with a threshold reference value, such that when the parameter of the wheel orientation signal reaches or exceeds the threshold reference value, the control unit determines that the wheel has reached the desired orientation for commencement of the mapping sequence.

The means for scanning the wheel workpiece and for generating a wheel style mapping signal pattern comprises a wheel mapping sensor unit that in one currently preferred embodiment comprises a displacement sensing laser sensor that directs a focused laser beam that is reflected from a target to a detector in the sensor unit. The wheel mapping sensor unit preferably comprises a pair of sensors, and in a currently preferred embodiment comprises inner and outer focused laser displacement sensors, with the outer focused laser displacement sensor being radially offset from the inner sensor with respect to the wheel workpiece. The wheel mapping sensor unit is preferably mounted to a movable arm that can be moved forward to a position over the wheel workpiece to scan the wheel workpiece, and can be retracted away from the wheel workpiece when the wheel workpiece is moved into or out of the scanning position.

In a preferred aspect of the invention, the comparison of the wheel style mapping signal pattern with a reference wheel style mapping signal pattern is carried out by a control unit that receives a wheel style mapping signal pattern for one rotation of the wheel workpiece for identification of the wheel style. The control unit receives the wheel style mapping signal pattern and comprises a memory for storing one or more of the wheel style mapping signal patterns as reference wheel style mapping signal patterns, which allows the control unit to compare an individual test wheel style mapping signal pattern with a plurality of reference wheel style mapping signal patterns.

In one presently preferred embodiment, the control unit comprises means for integrating the reference signal over a 360 degree rotation of the wheel workpiece, and to determine a comparison with a previously stored value, and the control unit is preferably a microprocessor based controller. The control unit preferably further comprises means for transferring the wheel workpiece for further processing in accordance with the specific wheel style of the wheel workpiece if the wheel style mapping signal pattern is determined to be of a recognized wheel style pattern. The control unit preferably controls the gate to the wheel recognition station, the positioning of the sensor for sensing orientation of a wheel workpiece for scanning, the gripper at the wheel recognition station, the positioning of the platform for scanning of the wheel workpiece, as well as the positioning of the mapping sensor unit.

The present invention also provides for a method for identifying styles of wheels and orienting the wheels for processing in a motor vehicle wheel processing system, involving the steps of positioning a wheel over the wheel recognition platform, radially orienting the wheel on the wheel recognition platform and generating a wheel orientation signal indicating the wheel has reached the starting position for scanning of the wheel, scanning the wheel responsive to the wheel orientation signal and generating a wheel style mapping signal pattern, and comparing the test wheel style mapping signal pattern with at least one reference wheel style mapping signal pattern. In a presently preferred embodiment, positioning the wheel over the wheel recognition platform comprises gripping the wheel to place the wheel on the wheel recognition platform, and moving the wheel recognition platform to position the wheel in a wheel screening position.

In a presently preferred aspect of the invention, radially orienting the wheel on the wheel recognition platform comprises rotating the wheel, sensing a marker on the rim of the wheel, and currently preferably comprises directing a focused laser beam to the wheel, sensing the reflection of the laser beam from the wheel, and generating a wheel orientation signal indicating the wheel has reached the starting position for scanning of the wheel. Radially orienting the wheel preferably comprises comparing a parameter of the wheel orientation signal with a threshold reference value, and determining that the wheel has reached the desired orientation for commencement of the mapping sequence when the wheel orientation signal is equal to or greater than the threshold reference value. Once the wheel is properly oriented, the wheel is preferably rotated at a steady rate of rotation responsive to the wheel orientation signal.

In a currently preferred embodiment, the step of scanning the wheel comprises directing a focused laser beam onto the wheel, sensing the reflection of the laser beam from the wheel, and generating a wheel style mapping signal pattern. The wheel is preferably mapped with a mapping sensor by moving the mapping sensor forward to a position over the wheel to scan the wheel, and retracting the mapping sensor away from the wheel when the wheel is moved into or out of the screening position. In one preferred aspect, the step of scanning the wheel comprises rotating the wheel 360 degrees, and storing the mapping signal to provide a mapping signal pattern for identification of the wheel style. Averaging the mapping signal can also be performed by integrating the signal over a plurality of rotations of the wheel. One or more of the mapping signal patterns can be stored for use as a reference mapping signal pattern, so that input mapping signal patterns can be compared with one or more reference wheel style mapping signal patterns.

If the mapping signal pattern is determined to be of a recognized wheel style pattern, the wheel can then be transferred for further processing in accordance with the specific wheel type that has been identified, and if the wheel style is not identified, the wheel can be transferred to a holding area for further identification and processing.

The wheel recognition system rotates the wheel during scanning, and advantageously uses a servo system to control rotary speed of wheel, so as to begin the mapping of different wheels at the same starting position from the orientation marker. The resultant map is thus useful in identifying successive wheels rotated at the same rotary speed.

The wheel recognition system also advantageously uses an axially positioned laser sensor to orient the wheel radially and to provide the starting position for scanning rotation of wheel. The laser sensor unit typically includes a pair of lasers directed toward the position of the wheel at different radial positions on the wheel. Light is typically reflected from the reflective areas of the wheel, and each laser has a sensor to detect light reflected from the wheel, producing a signal at reflective areas, and not producing a signal at the non-reflective positions on the wheels, such as at the holes in the wheels between spokes. Each laser sensor produces a distinctive signal pattern, depending upon the unique configuration of the spokes and other reflective and non-reflective features of the wheels. Comparisons can thus be made between the signals produced by the laser sensors and the reference signals by the map at each instant during scanning of the wheels, for each of the different types of wheels to be identified. In this way, the wheel being scanned is identified as a particular one of the different types of wheels. This identification is essentially complete by the time that the wheel being sensed has been completely scanned.

Depending upon the identification of the wheel, an operation can then be performed that is appropriate for the particular type of wheel identified. This operation can be performed on an automatic basis immediately after the wheel identification. For example, the wheel may be painted a particular color appropriate for the particular type of wheel identified. As another example, the wheel may be provided with a particular type of packing in a container. As a further example, a hole for a valve stem may be drilled at a particular position in the wheel appropriate for the particular type of wheel identified.

These and other aspects and advantages of the invention will become apparent from the following detailed description and the accompanying drawings, which illustrate by way of example the features of the invention.

DETAILED DESCRIPTION OF THE PREFERRED EMBODIMENTS

With the great diversity of styles, configurations and dimensions of motor vehicle wheels that are available, an automated assembly line typically must be set up for one type of wheel at a time, often requiring considerable amounts of down time to accommodate processing or manufacture of a variety of wheels. Manual identification, measurement and orientation of motor vehicle wheels during manufacturing or processing of such wheels can be time consuming and error prone.

As is illustrated in the drawings, the invention is thus embodied in a wheel style recognition system for identifying and orienting wheel workpieces, and a method for identifying styles of wheels and orienting the wheels for processing in a motor vehicle wheel processing system. In a presently preferred embodiment illustrated in FIGS. 1–10, the wheel style recognition system 10 typically includes a conveyor 12 provided for delivering a series of wheels 14 to the wheel style recognition station 16. The conveyor can, for example, be a motorized roller conveyor having a plurality of individual rollers 17. The conveyor includes a gate 18 that can be raised from a lowered position to a raised position extending through the rollers of the conveyor into the path of the wheels on the conveyor to block movement of a wheel onto the staging area 20 of the wheel style recognition station until the wheel is to be received by the wheel style recognition station for screening. When the gate is lowered from the path of the wheel, the wheel continues to move along the conveyor to the wheel style recognition station, where it is gripped by the arms 21 of the gripper assembly 22 and positioned over a wheel recognition platform 24, shown in FIG. 2 in a raised position, for purposes of illustration. The wheel recognition platform 24 is preferably movable between a lowered position for accepting a wheel, and the raised, wheel screening position 26. In a presently preferred embodiment, once the wheel is positioned at the wheel recognition station, the platform is then typically raised to lift the wheel to a raised wheel screening position 26, such as by a pneumatic lift cylinder, for example.

Figure 3:
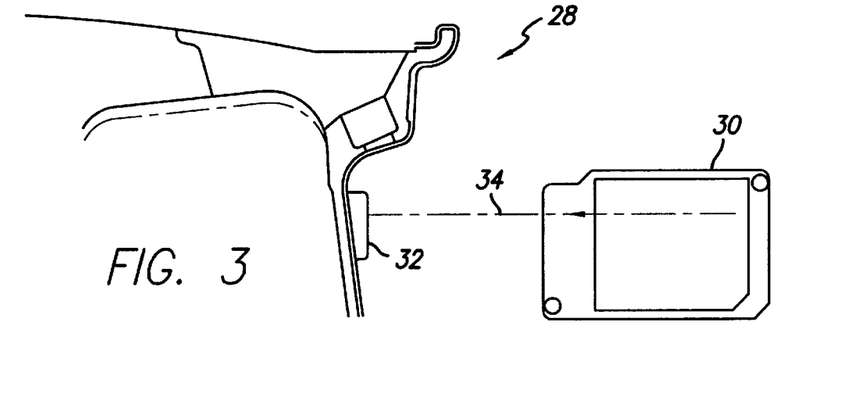
FIG. 3 illustrates a wheel orientation sensor according to the present invention sensing a marker on a cast wheel.
Figures 4, 5:
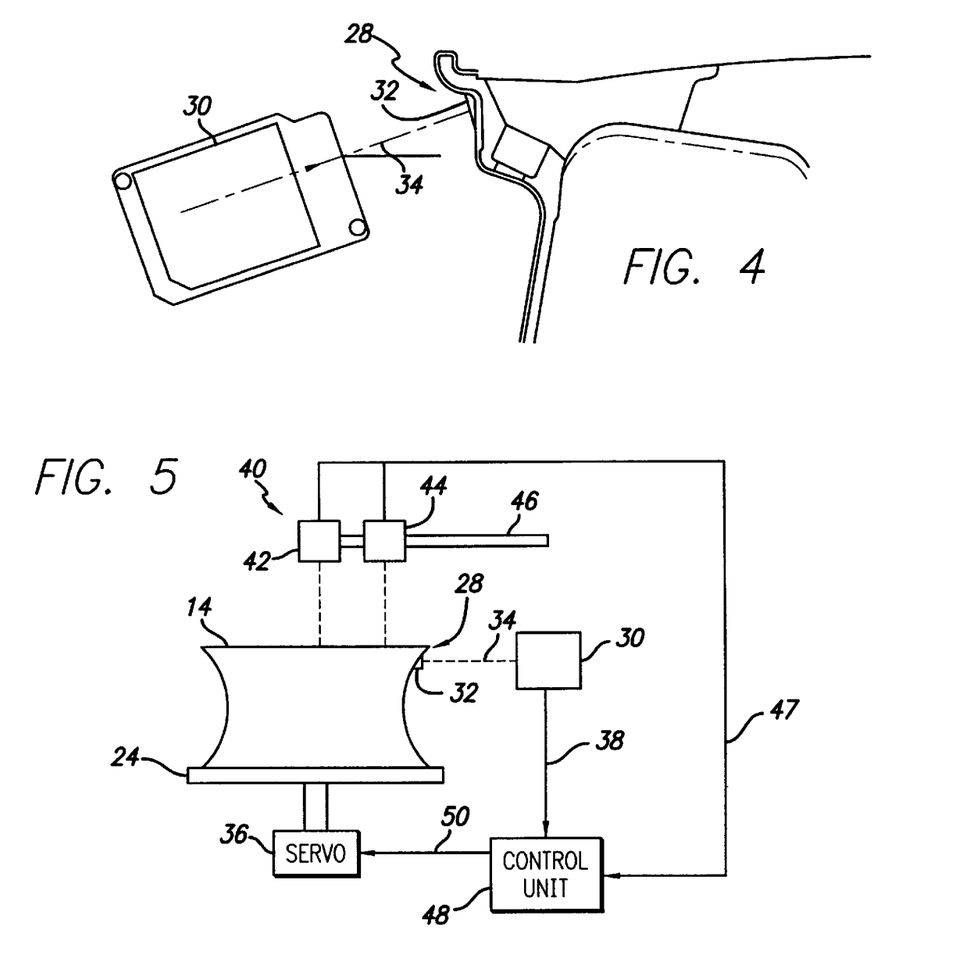
FIG. 4 illustrates a wheel orientation sensor according to the present invention sensing a marker on a forged wheel.
FIG. 5 is a schematic diagram of the wheel style recognition system of FIG. 1.

In the wheel screening position, the rim 28 of the wheel is aligned with a wheel orientation sensor 30 for detecting a marker on the wheel, which in a currently preferred embodiment is a raised tab or boss 32 on the rim of the wheel, although an indentation or depression on the outer rim or face of the wheel may also be suitable. The wheel orientation sensor is preferably a displacement sensing laser sensor that directs a focused laser beam 34 that is reflected from a target, such as the tab, to a detector in the sensor unit, to establish the radial position of a cast or forged boss or depression serving as a marker on the outer diameter or face of the wheel. One presently preferred wheel orientation sensor is the low power IDEC MXIC-AKI laser displacement sensor, available from IDEC IZUMI Corp., Japan, although other similar sensors may also be suitable for use as a wheel orientation sensor. When the marker is a raised boss or tab, the tab on the wheel rim preferably has a minimum height of 4.5 mm, and a minimum width of 5.0 mm. When the marker is an indentation or depression, the indentation or depression preferably has a minimum depth of 4.5 mm, and a minimum width of 5.0 mm. is used Either as a station prior to the wheel screening position or at the wheel screening position, additional sensors can be provided for independently checking the overall height or width of the rim of a wheel workpiece, and the "back-set" distance from the inboard rim flange to the mounting pad of the wheel workpiece, such as by a pair of wide range linear transducers. This option is particularly useful for after-market wheels that have the same face styles but different back-sets. At this same station, wheels can optionally also be checked for pulled centers, snap cap or hub cap differentials, such as by using an overhead auto compensating gauge head assembly with LVDT and electronic column gauge. A machine interface additionally can be provided to control offset adjustments to subsequent processing and manufacturing operation centers or stations, at which such operations as drilling or painting are typically job specific for the wheel diameter, center bore and back-set dimensions of each wheel workpiece.

Figure 1:
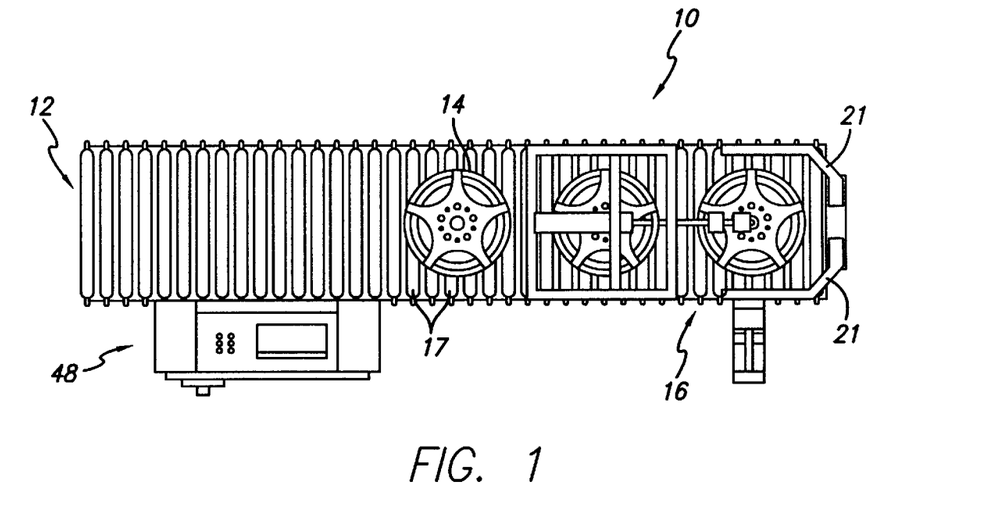
FIG. 1 is a top plan view of the wheel style recognition system of the invention.
Figure 2:
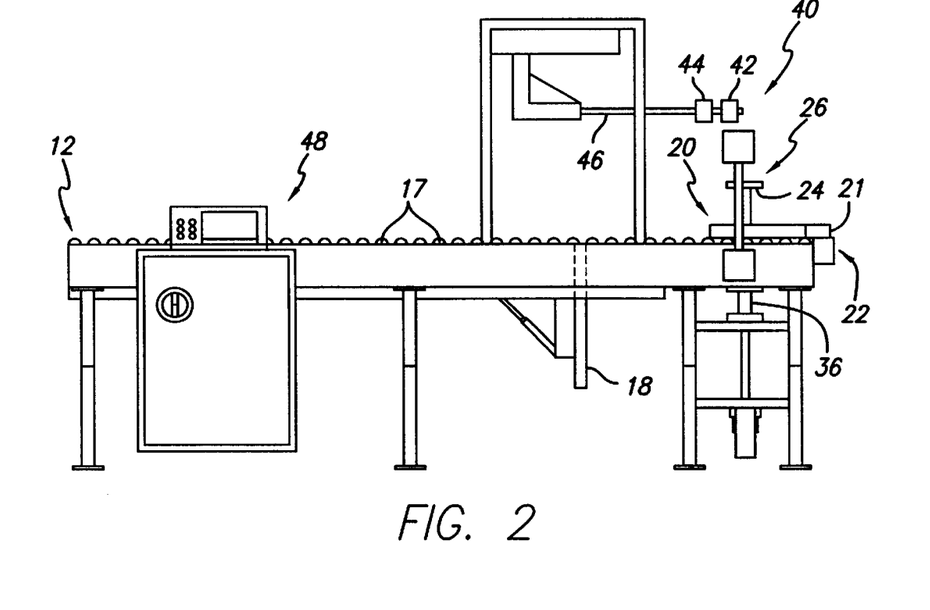
FIG. 2 is a side elevational view of the wheel style recognition system of FIG. 1.

Referring to FIGS. 2 and 5, when the wheel is properly aligned in the raised position on the wheel screening platform, the wheel screening platform is driven by a servomotor 36 to rotate the wheel at a steady rate of rotation, typically from 16 to 375 degrees. When the tab is oriented directly opposite the wheel orientation sensor, the wheel orientation sensor generates a wheel orientation signal 38 indicating the wheel has reached the starting position for scanning of the wheel. The servomotor then drives the wheel screening platform at a steady rate of rotation while a wheel mapping sensor unit 40 scans the wheel.

The mapping sensor unit preferably includes a pair of radially offset focused laser displacement sensors, comprising an inner focused laser displacement sensor 42, and an outer focused laser displacement sensor 44 that is radially offset from the inner sensor 42. The focused laser displacement sensors of the mapping sensor unit are typically of the type described above, and are preferably mounted to a movable arm 46 that can be moved forward to a position over the wheel to scan the wheel, and retracted away from the wheel when the wheel is moved into or out of the screening position. The inner sensor is preferably positioned radially inward of the outer sensor during screening, closest to the center of the wheel and generally over the hub of the wheel, while the outer sensor is preferably positioned closer to the rim and generally over the area of the spokes of the wheel. While in the embodiment described the mapping sensor unit preferably includes a pair of focused laser displacement sensors, to provide improved accuracy, and redundancy to the wheel style recognition system, the mapping sensor unit can alternatively comprise one or more such sensors, and it should be recognized that other similar sensors may also be suitable for use as a mapping sensor.

After orientation has been established, the wheel is rotated 360 degrees to identify the wheel style using the pair of radially offset lasers to generate a signal pattern 47 serving as a topographical map of the wheel style profile at the two radially offset locations, and match it with a reference pattern. One full turn of mapping of the wheel is provided for identification of the wheel style. The mapping signal pattern can be recorded for use as a reference mapping signal pattern, for comparison with wheel style mapping signal patterns during wheel screening.

If the test mapping signal pattern is determined to be of a recognized wheel style pattern, then the wheel is transferred for further processing in accordance with the specific wheel type that has been identified. However, if the wheel style is not identified, it can be rejected and directed to a different area for further identification and processing later. It should also be recognized that the wheel orientation and wheel style mapping functions of the invention can be carried out in a linear manner by linear movement of the wheels along the conveyor, without the necessity of rotation of the wheels on the raised wheel recognition platform.

A control unit 48 controls the operation of the conveyor, the operation of the gate to the wheel screening station, the positioning of the sensor for sensing orientation of a wheel for screening, the gripper assembly for gripping a wheel for screening, the positioning of the platform for screening of the wheel, and the positioning of the mapping sensor unit. The control unit preferably also permits the setting of a mapping sensor mask value that corresponds to the setting of the depth of field of the mapping sensors, and allows the setting of the depth of field in a range of approximately from 1 mm up to 36 mm (up to about 1 7/16 inch). The control unit is preferably a microprocessor based controller that receives the wheel orientation signal 38 indicating the wheel has reached the starting position for scanning of the wheel from the wheel orientation sensor, and generates a command signal 50 received by the servomotor 36 controlling the commencement and operation of the servomotor 36 for the wheel scanning sequence in response to the wheel orientation signal. The control unit preferably compares the intensity or amplitude of the wheel orientation signal with a threshold reference value, such that when the wheel orientation signal reaches or exceeds the threshold reference value, the control unit determines that the wheel has reached the desired orientation for commencement of the mapping sequence.

The control unit also receives the wheel style mapping signal pattern 47 from the mapping sensor unit, and includes a memory for storage of the wheel style mapping signal pattern as a reference. The control unit currently preferably can store up to six such reference wheel style mapping signal patterns, but it is contemplated that the control unit memory could be configured to store additional wheel style mapping signal patterns.

The control unit also compares each test wheel style mapping signal pattern with the reference wheel style mapping signal patterns stored. Comparison of the test and reference can for example involve integration of the reference signal over two full rotations of the wheel, and averaging the integrated signal to determine a measured "true" integrated reference signal value for a single rotation. The reference mapping signal can, for example, be divided into a number of small intervals having a predetermined period, and summed during each interval when the signal exceeds a threshold mapping signal value. The test mapping signal during screening of a wheel can then be summed to provide an integrated test pattern value when the test mapping signal exceeds the threshold mapping signal value during intervals corresponding to those of the reference mapping signal pattern, and the test mapping signal can be subtracted when test mapping signal exceeds the threshold mapping signal value at a different time intervals than those of the reference mapping signal pattern. The reference signal pattern is currently preferably set at approximately 80% of the true measured value, to allow recognition of wheel styles with a desired confidence level, despite minor structural variations in the wheels of a particular wheel style due to the existence of flash which can occur at random from cast or forged wheels, minor aberrations in shape or reflectivity of the wheels, and the like. Thus, if the test mapping signal exceeds a reference signal pattern, a ready signal is generated by the control unit, and a signal is generated indicating identification of the particular wheel style with the reference pattern with which the test mapping signal was compared. The wheel style pattern identification can also be matched with a measured width and back-set for further identification of the wheel, and the ready signal is then typically generated to cause the wheel to be picked up or transferred. Along with this ready signal, a code unique to that wheel can be sent to a robot or other device telling it which specific wheel it is so that a desired process can be performed on the wheel workpiece. If the wheel does not meet the known criteria for width, back-set, orientation or style, it will be placed on an eject conveyor by the robot and transferred outside the cell for final determination.

In operation, the input of a reference signal pattern to the control unit is typically accomplished by selection by an operator of an automatic "teach mode" of the control unit from an operator control panel. The teach mode steps the wheel workpiece being used as a reference through each of the individual processes using an automatic teach mode on the control panel. At each of the stages the data for the specific characteristics of that wheel style are stored, and settings of tolerances or deviations from the taught wheel can be made as required, so that abnormalities such as roundness, flash in the spoke and side core areas can be accounted for. Typically the teaching of a new wheel style can be accomplished in less than five minutes.

The system of the invention is advantageous for determining the radial orientation of a wheel workpiece and style identification of a wheel workpiece for a variety of wheel workpieces, such as cast or forged aluminum alloy wheels. However, it should be recognized that the system of the invention can be applied to identification and processing of different types of rotary members other than wheels.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A wheel style recognition system for identifying styles of wheel workpieces and orienting the wheel workpieces, the wheel workpieces having a central hub for mounting to an axle of a motor vehicle, a rim portion, and a spoke section connecting the rim portion to the hub, the wheel style recognition system comprising:

a wheel style recognition station;

a conveyor for delivering a wheel workpiece to said wheel style recognition station;

a servomotor for rotating the wheel workpiece in a scanning position at said wheel style recognition station at a steady rate of rotation;

a wheel orientation sensor for sensing the radial orientation of the wheel workpiece on said wheel style recognition station, and for generating a radial orientation signal;

a wheel mapping sensor unit for scanning the wheel workpiece when said servomotor rotates the wheel workpiece and for generating a wheel style mapping signal pattern; and a control unit for comparing said wheel style mapping signal pattern with at least one reference wheel style mapping signal pattern.

2. The wheel style recognition system of claim 1, wherein said wheel mapping sensor unit comprises a displacement sensing laser sensor that directs a focused laser beam that is reflected from a target to a detector in said sensor.

3. The wheel style recognition system of claim 1, wherein said wheel mapping sensor unit is mounted to a movable arm that can be moved forward to a position over the wheel workpiece to scan the wheel workpiece, and retracted away from the wheel workpiece when the wheel workpiece is moved into or out of said scanning position.

4. The wheel style recognition system of claim 1, wherein said wheel mapping sensor unit comprises a pair of focused laser displacement sensors.

5. The wheel style recognition system of claim 1, wherein said control unit receives a wheel style mapping signal pattern for a plurality of rotations of the wheel workpiece, and determines an averaged mapping signal pattern based upon said wheel style mapping signal pattern for identification of the wheel style.

6. The wheel style recognition system of claim 1, wherein said control unit comprises a memory for storing a wheel style mapping signal pattern as a reference wheel style mapping signal pattern.

7. The wheel style recognition system of claim 1, wherein said control unit further comprises means for transferring the wheel workpiece for further processing in accordance with the specific wheel style of the wheel workpiece if said wheel style mapping signal pattern is determined to be of a recognized wheel style pattern.

8. The wheel style recognition system of claim 1, wherein said control unit is a microprocessor based controller.

9. The wheel style recognition system of claim 1, further comprising a gate for controlling the delivery of the wheel workpieces to said wheel style recognition station by said conveyor.

10. The wheel style recognition system of claim 9, further comprising means for moving said gate between a first position and a second position, said gate in said first position extending into a path of the wheel workpiece on said conveyor to block movement of the wheel workpiece to said wheel style recognition station until the wheel workpiece is to be received by said wheel style recognition station, and said gate in said second position being removed from the path of the wheel workpiece to allow the wheel workpiece to continue to move along said conveyor to said wheel style recognition station.

11. The wheel style recognition system of claim 1, wherein said wheel mapping sensor unit comprises an inner focused laser displacement sensor and an outer focused laser displacement sensor that is radially offset from said inner sensor.

12. The wheel style recognition system of claim 11, wherein said wheel mapping sensor unit inner sensor is positioned radially inward of said outer sensor during scanning, closest to the center of the wheel workpiece and generally over the hub of the wheel workpiece, and said outer sensor is positioned closer to the rim and generally over the area of the spokes of the wheel workpiece.

13. The wheel style recognition system of claim 1, wherein said wheel style recognition station comprises a wheel style recognition platform, and said conveyor delivers the wheel workpiece to said wheel style recognition platform.

14. The wheel style recognition system of claim 13, further comprising a gripper assembly for gripping each wheel workpiece sequentially and positioning each wheel workpiece over said wheel recognition platform.

15. The wheel style recognition system of claim 13, wherein said wheel style recognition station comprises means for moving said wheel style recognition platform between a first position for receiving the wheel workpiece and a second position for scanning of the wheel workpiece.

16. The wheel style recognition system of claim 15, wherein said means for moving said wheel style recognition platform comprises a lift for raising said platform from a lowered first position for receiving the wheel workpiece to a raised second position for scanning of the wheel workpiece, and for lowering said wheel style recognition platform to said lowered first position for receiving another wheel workpiece.

17. The wheel style recognition system of claim 1, wherein said wheel orientation sensor comprises a sensor for detecting a marker on the wheel workpiece.

18. The wheel style recognition system of claim 17, wherein said marker is a raised tab on the rim of the wheel workpiece.

19. The wheel style recognition system of claim 17, wherein said marker is an indentation on the rim of the wheel workpiece.

20. The wheel style recognition system of claim 17, wherein said wheel orientation sensor comprises a displacement sensing laser sensor that directs a focused laser beam that is reflected from said marker to a detector in said sensor.

21. The wheel style recognition system of claim 17, wherein when said marker is oriented directly opposite said wheel orientation sensor, said wheel orientation sensor generates a wheel orientation signal indicating the wheel workpiece has reached a starting position for scanning of the wheel workpiece.

22. A wheel style recognition system for identifying styles of wheel workpieces and orienting the wheel workpieces, the wheel workpieces having a central hub for mounting to an axle of a motor vehicle, a rim portion, and a spoke section connecting the rim portion to the hub, the wheel style recognition system comprising:

a wheel style recognition station;

means for delivering a wheel workpiece to a scanning position at said wheel style recognition station;

means for sensing the radial orientation of the wheel workpiece on said wheel style recognition station, and for generating a wheel orientation signal;

means for scanning the wheel workpiece and for generating a wheel style mapping signal pattern; and means for comparing said wheel style mapping signal pattern with at least one reference wheel style mapping signal pattern.

23. The wheel style recognition system of claim 22, further comprising means for rotating the wheel workpiece at a steady rate of rotation.

24. The wheel style recognition system of claim 22, wherein said wheel workpiece has a marker, and said means for sensing the radial orientation of the wheel workpiece comprises means for detecting said marker on the wheel workpiece.

25. The wheel style recognition system of claim 22, wherein said means for comparing said wheel style mapping signal pattern with at least one reference wheel style mapping signal pattern further comprises means for comparing a parameter of said wheel orientation signal with a threshold reference value, and for determining that the wheel has reached the desired orientation for commencement of the mapping sequence when said parameter of said wheel orientation signal reaches or exceeds said threshold reference value.

26. The wheel style recognition system of claim 22, wherein said means for scanning the wheel workpiece is mounted to a movable arm that can be moved forward to a position over the wheel workpiece to scan the wheel workpiece, and retracted away from the wheel workpiece when the wheel workpiece is moved into or out of the scanning position.

27. The wheel style recognition system of claim 22, wherein said means for scanning the wheel workpiece comprises a plurality of sensors.

28. The wheel style recognition system of claim 22, further comprises means for transferring the wheel workpiece for further processing in accordance with the specific wheel style of the wheel workpiece if the wheel style mapping signal pattern is determined to be of a recognized wheel style pattern.

29. The wheel style recognition system of claim 22, further comprising means for controlling the positioning of said means for scanning the wheel workpiece.

30. The wheel style recognition system of claim 22, further comprising means for receiving said wheel orientation signal indicating the wheel has reached the starting position for scanning of the wheel from said wheel orientation sensor, and for commanding the commencement of the wheel scanning sequence in response to said wheel orientation signal.

31. The wheel style recognition system of claim 22, wherein said means for delivering a wheel workpiece to a scanning position at said wheel style recognition station comprises gripping means for gripping each wheel workpiece sequentially and positioning each wheel workpiece over said wheel recognition station.

32. The wheel style recognition system of claim 31, further comprising means for controlling said gripping means for gripping a wheel workpiece for scanning.

33. The wheel style recognition system of claim 22, wherein said means for comparing receives a wheel style mapping signal pattern for a full rotation of the wheel workpiece, and determines the mapping signal pattern based upon said full rotation.

34. The wheel style recognition system of claim 33, wherein said means for comparing comprises means for integrating said reference signal over the full rotation of the wheel workpiece, and for comparing the signal with a stored reference pattern.

35. The wheel style recognition system of claim 22, wherein said wheel style recognition station comprises a wheel style recognition platform, and said means for delivering a wheel workpiece delivers the wheel workpiece to said wheel style recognition platform.

36. The wheel style recognition system of claim 35, wherein said wheel style recognition station comprises means for moving said wheel style recognition platform between a first position for receiving the wheel workpiece and a second position for scanning of the wheel workpiece.

37. The wheel style recognition system of claim 35, further comprising means for controlling the positioning of the wheel recognition platform for scanning of the wheel workpiece.

38. The wheel style recognition system of claim 22, further comprising means for controlling the delivery of the wheel workpieces to said wheel style recognition station.

39. The wheel style recognition system of claim 38, wherein said means for controlling the delivery of the wheel workpieces comprises a gate, and further comprising means for moving said gate between a first position and a second position, said gate in said first position extending into a path of the wheel workpiece to block movement of the wheel workpiece to said wheel style recognition station until the wheel workpiece is to be received by said wheel style recognition station, and said gate in said second position being removed from the path of the wheel workpiece to allow the wheel workpiece to continue to move to said wheel style recognition station.

40. The wheel style recognition system of claim 39, further comprising means for controlling movement of said gate.

41. The wheel style recognition system of claim 22, wherein said means for comparing receives and stores said wheel style mapping signal pattern as a reference wheel style mapping signal pattern.

42. The wheel style recognition system of claim 41, wherein said means for comparing stores a plurality of reference wheel style mapping signal patterns.

43. The wheel style recognition system of claim 42, wherein said means for comparing compares each test wheel style mapping signal pattern with a plurality of reference wheel style mapping signal patterns.

44. A method for identifying styles of wheels and orienting the wheels for processing in a motor vehicle wheel processing system, the wheels having a central hub for mounting to an axle of a motor vehicle, a rim portion, and a spoke section connecting the rim portion to the hub; the motor vehicle wheel processing system including a wheel style recognition station having a wheel recognition platform, a conveyor for delivering a series of wheels to the wheel style recognition station to the wheel recognition platform, a gate movable between a first position blocking movement of wheels onto the wheel recognition platform and a second position removed from the path of the wheels, the method comprising the steps of:

positioning a wheel over said wheel recognition platform;

radially orienting the wheel on said wheel recognition platform and generating a wheel orientation signal indicating the wheel has reached the starting position for scanning of the wheel;

scanning the wheel responsive to said wheel orientation signal and generating a wheel style mapping signal pattern; and comparing the test wheel style mapping signal pattern with at least one reference wheel style mapping signal pattern.

45. The method of claim 44, wherein said step of positioning a wheel over said wheel recognition platform comprises gripping the wheel.

46. The method of claim 44, wherein said step of positioning a wheel over said wheel recognition platform comprises moving said wheel recognition platform to position the wheel in a wheel screening position.

47. The method of claim 44, wherein said step of radially orienting the wheel on said wheel recognition platform comprises directing a focused laser beam to the wheel, sensing the reflection of the laser beam from the wheel, and generating a wheel orientation signal indicating the wheel has reached the starting position for scanning of the wheel.

48. The method of claim 44, wherein said step of scanning the wheel further comprises rotating the wheel at a steady rate of rotation responsive to said wheel orientation signal.

49. The method of claim 44, wherein said step of scanning the wheel comprises directing a focused laser beam onto the wheel, sensing the reflection of the laser beam from the wheel, and generating a wheel style mapping signal pattern.

50. The method of claim 44, wherein said step of scanning the wheel with a mapping sensor comprises moving said mapping sensor forward to a position over the wheel to scan the wheel, and retracting said mapping sensor away from the wheel when the wheel is moved into or out of the scanning position.

51. The method of claim 44, wherein said mapping sensor comprises inner and outer focused laser displacement sensors, and wherein said step of scanning the wheel with a mapping sensor comprises positioning said inner sensor radially inward of said outer sensor during scanning, closest to the center of the wheel and generally over the hub of the wheel, and positioning said outer sensor closer to the rim and generally over the area of the spokes of the wheel.

52. The method of claim 44, further comprising the step of storing the mapping signal for use as a reference mapping signal pattern.

53. The method of claim 44, wherein said step of comparing the test wheel style mapping signal pattern with at least one reference wheel style mapping signal pattern comprises comparing said mapping signal pattern with a plurality of reference wheel style mapping signal patterns.

54. The method of claim 44, further comprising the step of transferring the wheel for further processing in accordance with the specific wheel type that has been identified if said mapping signal pattern is determined to be of a recognized wheel style pattern, and transferring the wheel to a holding area for further identification and processing if the wheel style is not identified.

55. The method of claim 44, further comprising the step of storing a plurality of wheel style mapping signal patterns as a plurality of reference wheel style mapping signal patterns.

56. The method of claim 44, wherein said step of radially orienting the wheel on said wheel recognition platform comprises rotating the wheel and sensing a marker on the rim of the wheel.

57. The method of claim 56, wherein said step of radially orienting the wheel comprises comparing a parameter of said wheel orientation signal with a threshold reference value, and determining that the wheel has reached the desired orientation for commencement of the mapping sequence when said wheel orientation signal is equal to or greater than said threshold reference value.

58. The method of claim 44, wherein said step of scanning the wheel comprises rotating the wheel a full rotation, and determining the mapping signal pattern based upon said full rotation.

59. The method of claim 58, wherein said step of comparing comprises integrating said reference signal over the full rotation of the wheel, and comparing the signal with a stored reference pattern.

60. The method of claim 44, further comprising the step of storing a wheel style mapping signal pattern as a reference wheel style mapping signal pattern.

61. The method of claim 59, wherein said step of storing said wheel style mapping signal pattern as a reference wheel style mapping signal pattern comprises setting said reference signal pattern at a predetermined percentage of the measured value.

62. A wheel recognition system for identifying a production wheel having a hub at a central position on the wheel and having at least one spoke which is displaced radially outwardly from the hub and which is provided with a particular configuration, including means for providing a rotation of the wheel at a substantially constant speed, a sensor disposed at a particular radial position relative to the wheel to direct energy to the wheel and to receive energy reflected from the wheel in accordance with the configuration of the spoke in the wheel at the radial position of the sensor and to produce a signal in accordance with the characteristics of the energy reflected to the sensor, means for initiating the production of the signal at a particular rotary position of the production wheel during the rotation of the wheel, means for providing a pattern of signals indicating the characteristics of energy reflected from a spoke configuration on a reference wheel at progressive rotary positions on the wheel at substantially the same radial position as the sensor, and means for comparing the pattern of the signals produced at the progressive rotary positions of the production wheel and the reference wheel to identify whether the particular configuration of the spoke on the production wheel corresponds to the spoke configuration on the reference wheel.

63. A wheel recognition system as set forth in claim 62 wherein the means for providing the pattern of the signals from the reference wheel provides this pattern at substantially the same speed as the substantially constant speed at which the production wheel is rotated.

64. A wheel recognition system as set forth in claim 62 wherein the rotation means includes a servo for maintaining the rotation of the wheel at the substantially constant speed.

65. A wheel recognition system as set forth in claim 62 wherein a second sensor is disposed in radially displaced relationship to the first sensor to direct energy to the wheel and to receive energy reflected from the wheel in accordance with the configuration of the spoke at the radial position of the second sensor and to produce a signal in accordance with the characteristics of the signal reflected to the second sensor and wherein the comparing means compares the pattern of the signals produced at the progressive rotary positions of the production wheel and the reference wheel at the radial position of the second sensor in identifying whether the particular configuration of the spoke on the production wheel corresponds to the spoke configuration of the reference wheel.

66. A wheel recognition system as set forth in claim 65, wherein the rotation means includes a servo for maintaining the rotation of the wheel at the substantially constant speed and wherein the means for providing the pattern of the signals from the reference wheel provides this pattern at substantially the same speed as the substantially constant speed at which the production wheel is rotated.

67. A wheel recognition system as set forth in claims 65, including means for providing a particular processing of the production wheel when the production wheel is identified as corresponding to the reference wheel.

68. A method of identifying the spoke configuration of a production wheel, including the steps of:

rotating the production wheel at a substantially constant speed, providing an indication at a start position of the production wheel, generating, at progressive rotary positions from the start position, an energy pattern indicative of the spoke configuration of the production wheel at a particular radial distance from the center of the production wheel, generating at the substantially constant speed an energy pattern at progressive rotary positions of a spoke configuration of a reference wheel at the particular radial distance from the center of the reference wheel, and comparing the energy patterns of the progressive rotary positions of the production and reference wheels at the particular radial distances from the centers of the wheels to determine if the spoke configuration of the production wheel corresponds to the spoke configuration of the reference wheel.

69. A method as set forth in claim 68, including the step of:

provided for a particular processing of the production wheel when the production wheel is identified as corresponding to the reference wheel.

70. A method as set forth in claim 68, including the steps of:

generating, at progressive rotary positions from the start position, an energy pattern indicative of the spoke configuration of the production wheel at a second radial distance from the center of the production wheel, and comparing the energy patterns at the progressive rotary positions of the production and reference wheels at the second radial distances from the centers of the wheels to determine if the spoke configuration of the production wheel corresponds to the spoke configuration of the reference wheel.

* * * * *